US007865428B2

(12) United States Patent
Pegaz-Paquet et al.

(10) Patent No.: US 7,865,428 B2
(45) Date of Patent: Jan. 4, 2011

(54) COMPUTER-IMPLEMENTED METHOD AND SYSTEM FOR MANAGING ACCOUNTING AND BILLING OF TRANSACTIONS OVER PUBLIC MEDIA SUCH AS THE INTERNET

(76) Inventors: Pascal Pegaz-Paquet, The World Trade Center, Ed. North 4A, Moll-De Barcelona (ES) 08039; Stephane Touboul, 1 Harmon Plaza, Secaucus, NJ (US) 07094

( * ) Notice: Subject to any disclaimer, the term of this patent is extended or adjusted under 35 U.S.C. 154(b) by 855 days.

(21) Appl. No.: 11/704,918

(22) Filed: Feb. 12, 2007

(65) Prior Publication Data
US 2007/0143231 A1 Jun. 21, 2007

Related U.S. Application Data

(62) Division of application No. 10/713,099, filed on Nov. 17, 2003, now Pat. No. 7,177,837.

(60) Provisional application No. 60/486,165, filed on Jul. 11, 2003.

(51) Int. Cl.
*G06Q 40/00* (2006.01)
(52) U.S. Cl. .............................. 705/38; 705/26; 705/40
(58) Field of Classification Search .................. 705/34, 705/40, 26, 38
See application file for complete search history.

(56) References Cited

U.S. PATENT DOCUMENTS

| | | | |
|---|---|---|---|
| 5,329,589 A | 7/1994 | Fraser et al. | |
| 5,825,883 A | 10/1998 | Archibald et al. | |
| 5,884,284 A | 3/1999 | Peters et al. | |
| 6,137,869 A | 10/2000 | Voit et al. | |
| 6,266,401 B1 | 7/2001 | Marchbanks et al. | |
| 6,282,276 B1 | 8/2001 | Felger | |
| 6,343,284 B1 | 1/2002 | Ishikawa et al. | |

(Continued)

FOREIGN PATENT DOCUMENTS

WO WO 01/61592 A1 8/2001

(Continued)

OTHER PUBLICATIONS

International Preliminary Report on Patentability issued in International application No. PCT/US2004/013567, dated Aug. 17, 2006.

*Primary Examiner*—Jagdish N Patel
(74) *Attorney, Agent, or Firm*—McDermott Will & Emery LLP

(57) ABSTRACT

A system and method for managing accounting and billing e-commerce (including m-commerce) transactions. The user may connect to the e-commerce network by placing a call from a land line or sending a text message. The user may then purchase goods and/or services after meeting required user qualifications, such as minimum age or credit rating. The user qualifications may be established within the framework of a gateway that assigns a unique identifier or personal identification number (PIN) for e-commerce network access once the qualifications are met. The user qualifications may also be established within the framework of a remote access server (RAS) that is accessed by a user through a downloadable automatic dialer having code containing a unique identifier relating to a merchant, product or service. The user is invoiced for the product or service according to the telephone from which the call originated.

12 Claims, 4 Drawing Sheets

U.S. PATENT DOCUMENTS

| | | |
|---|---|---|
| 6,529,592 B1 | 3/2003 | Khan |
| 6,553,108 B1 | 4/2003 | Felger |
| 6,570,870 B1 | 5/2003 | Berstis |
| 6,574,317 B1 * | 6/2003 | de Freitas ............. 379/127.02 |
| 6,577,858 B1 | 6/2003 | Gell |
| 6,975,708 B1 * | 12/2005 | Scherer ................. 379/88.22 |
| 2001/0037383 A1 | 11/2001 | Sabal |
| 2001/0039191 A1 | 11/2001 | Maierhofer |
| 2001/0049630 A1 | 12/2001 | Justice |
| 2002/0087682 A1 | 7/2002 | Roach |
| 2002/0099653 A1 | 7/2002 | De Souza et al. |
| 2002/0120756 A1 | 8/2002 | Lynam et al. |
| 2002/0128984 A1 | 9/2002 | Mehta et al. |
| 2002/0176579 A1 | 11/2002 | Deshpande et al. |
| 2003/0014327 A1 | 1/2003 | Skantze |
| 2003/0065615 A1 | 4/2003 | Aschir |
| 2004/0078328 A1 | 4/2004 | Talbert et al. |
| 2004/0081173 A1 | 4/2004 | Feather |
| 2004/0226459 A1 | 11/2004 | Hill et al. |

FOREIGN PATENT DOCUMENTS

| | | |
|---|---|---|
| WO | WO 01/86570 A1 | 11/2001 |
| WO | WO 03/032618 A1 | 4/2003 |
| WO | WO 03/081884 A1 | 10/2003 |

* cited by examiner

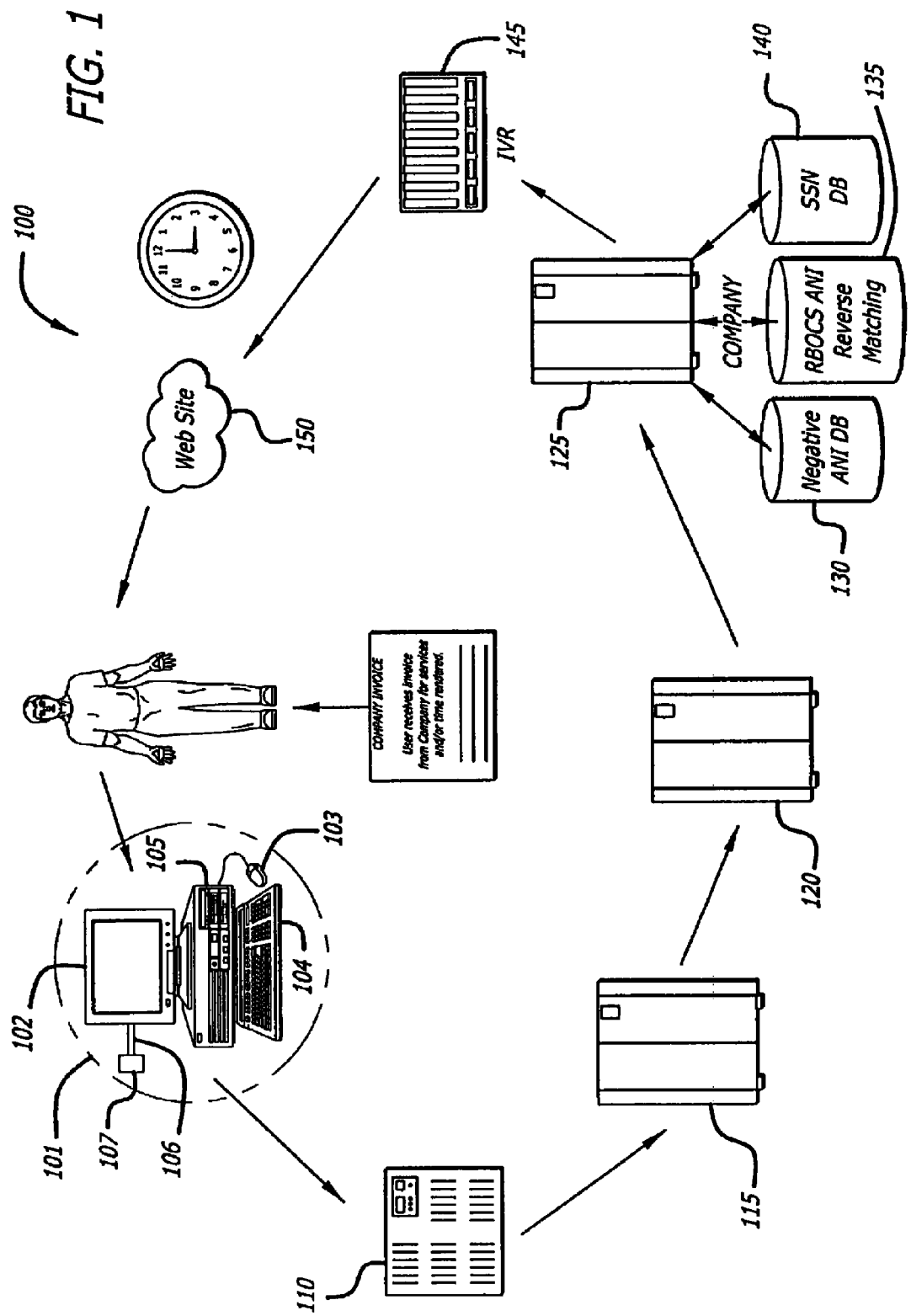

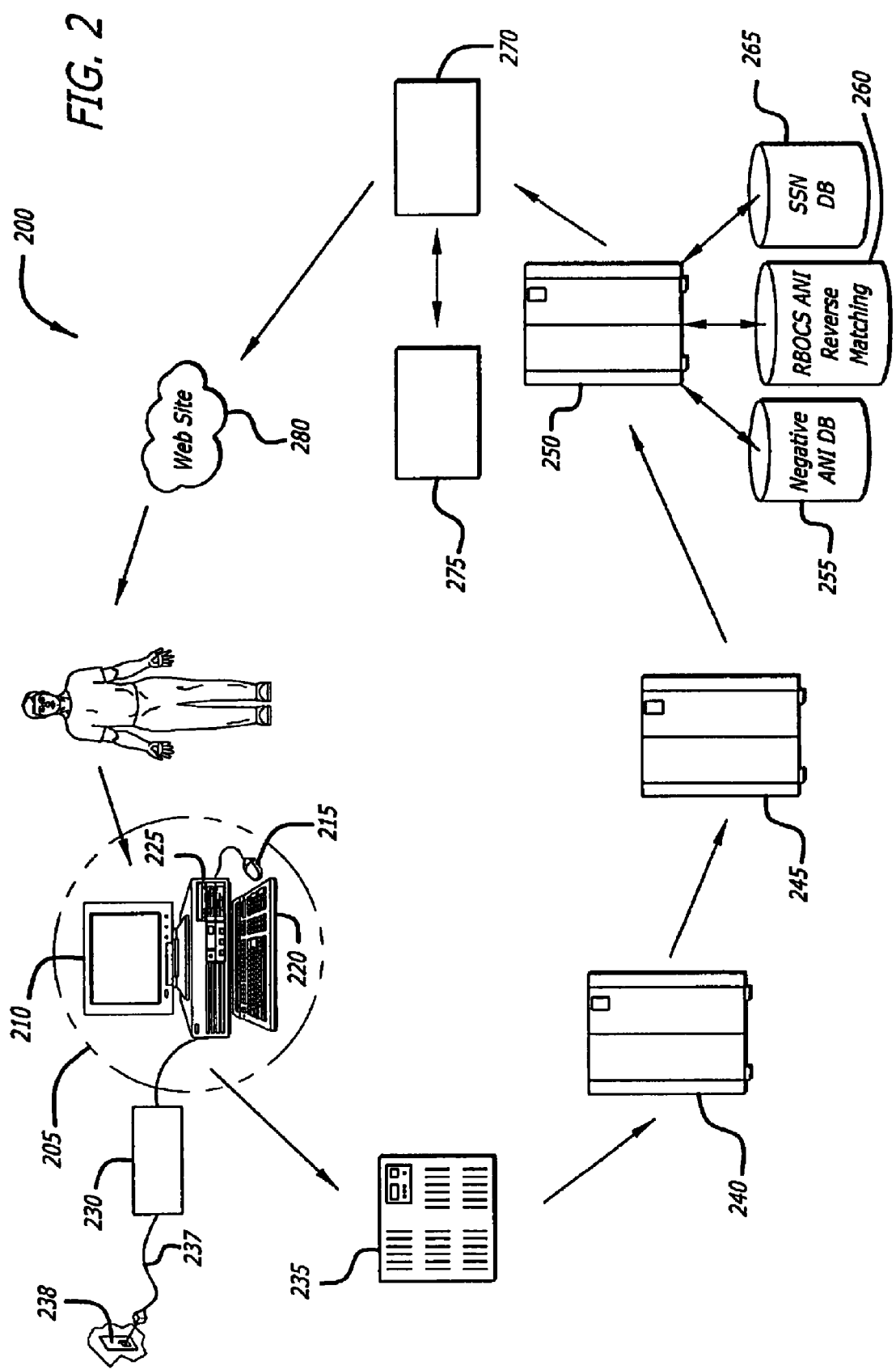

FIG. 3

Disclaimer 900#

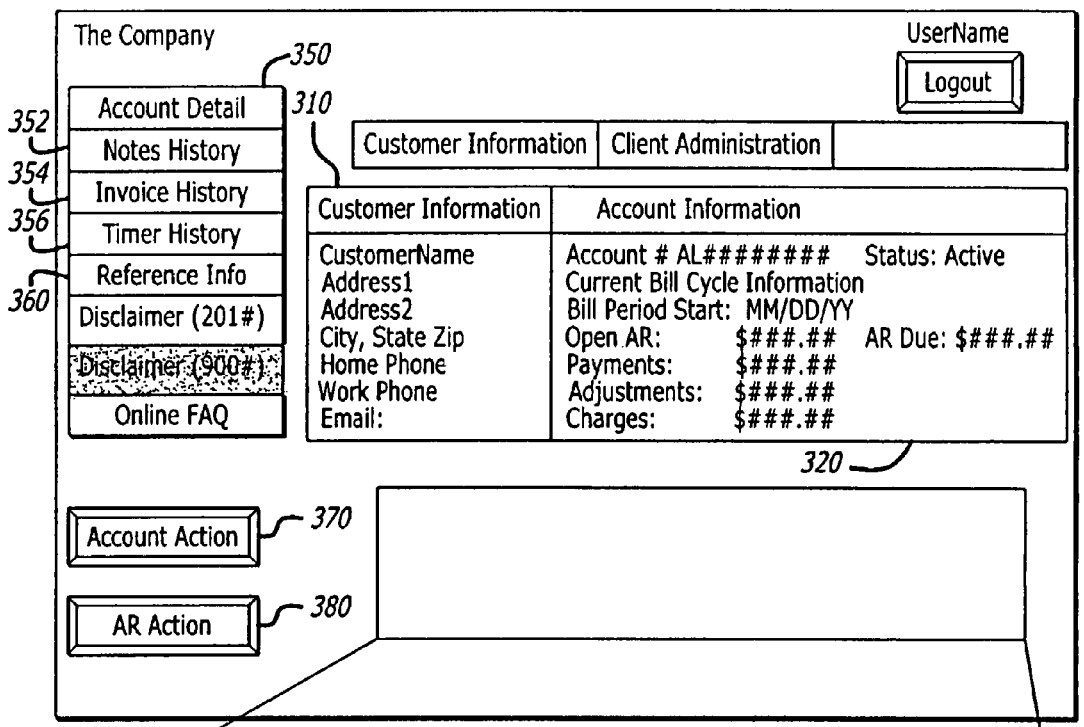

The Company

Disclaimer:
By choosing to use this entertainment service, your computer will terminate the modem connection to your local internet service provider. Your modem will then dial a PREMIUM RATE NUMBER (900-000-####) the charge for access to this entertainment service will appear on a bill that will be sent to you by your local phone co. This bill will be due and payable ten (10) days from the date you receive the bill.

By pressing the "I AGREE" button below:

4. You assert that you are the telephone line subscriber (who will be billed for the charge) or have been authorized by the telephone line subscriber to incur the per minute charge
5. You assert that you are 18 years of age or older, 21 in some states (you will need to check with your appropriate state regulatory office).
6. You, as the telephone subscriber whose number is being used to dial the PREMIUM RATE NUMBER (900)000-00##, understand and agree that you will be charged $4.99 per minute and such charge will appear on a bill you receive from the company.

This document is intended to be governed by the federal "Electronic Signatures Act", By pressing the "I Agree" button, you expressly consent to the terms expressed herin. If you do not agree with any of the statements, or do not wish to be charged for the call, click on the "I Disagree" button below.

If you are under eighteen years of age, you are not permitted to enter this website.

I AGREE

COMPUTER-IMPLEMENTED METHOD AND SYSTEM FOR MANAGING ACCOUNTING AND BILLING OF TRANSACTIONS OVER PUBLIC MEDIA SUCH AS THE INTERNET

CROSS REFERENCE TO RELATED APPLICATION

This application is a Divisional of U.S. patent application Ser. No. 10/713,099, filed Nov. 17, 2003, now U.S. Pat No. 7,177,837 which is based on U.S. Provisional Application Ser. No. 60/486,165 filed on Jul. 11, 2003 the contents of which are hereby incorporated by reference in their entirety.

FIELD OF THE DISCLOSURE

The present disclosure relates to e-commerce billing systems, and more particularly to an automated system for conducting and billing e-commerce transactions.

BACKGROUND OF THE DISCLOSURE

Along with the growth of e-commerce have emerged innovative methods of conducting and billing e-commerce transactions. One of the most widely used media for conducting e-commerce transactions is the Internet. E-commerce offers virtually limitless options as to the types of accessible consumer goods and services.

Videotext is one example of a service that may be accessed over the Internet. Videotext is an information service which provides for delivery of video and audio content to a user's computer or television screen. Videotext may include video in the form of still and/or moving pictures, viewable text, as well as audio. Other goods and services might include magazines, clothing, shoes, music, downloadable software programs, adult entertainment services and access to online publications such as newspapers and magazines.

Numerous business opportunities exist in e-commerce as do opportunities for consumer convenience and satisfaction. Often, the conduct of e-commerce transactions should be tailored to assuage consumer concerns regarding issues such as security, privacy and accessibility. The root of many such consumer concerns has been credit card usage in e-commerce transactions. Some users are concerned about the risk of identity theft as a result of online credit card usage, wherein sensitive personal information must be divulged in order to consummate a transaction. In other cases, the consumer concern is accessibility in that the users might not have access to a credit card. Accordingly, it is often desirable to conduct e-commerce transactions without a credit card.

E-commerce transactions are often not limited by geographical region. A single merchant in one country may have a customer base that spans several countries. Therefore, it is often useful for such merchants to consider habits of potential foreign consumers. In some European countries, credit card transactions constitute a small percentage of online transactions. Because a merchant may wish to broaden a customer base, the consummate a transaction with citizens of countries such as Europe. Availing the customer of the opportunity to conduct a transaction without a credit card increases business opportunities in foreign countries.

E-commerce transactions that are consummated without a credit card have created additional billing challenges for electronic retailers. Some e-commerce retailers have addressed these billing challenges with creative billing solutions, such as billing a line subscriber for transactions consummated on an e-commerce network, where the network was accessed by telephone.

In one example of an existing billing system for which a credit card is not required, the user can obtain information on how to access a private e-commerce network by browsing the Internet and following steps provided on a web page. Following the steps listed on the web page, the user dials a telephone number from the user's computer modem. The dialed number may be a toll or toll-free telephone number. The call is forwarded from the user's terminal to a remote terminal that is operated and administrated by a network service provider. This network service provider is capable of providing access to the e-commerce network that the user wishes to access. Prior to reaching the remote terminal, the call may be routed through various local and/or long distance telecommunications carriers.

As soon as a connection is established between the user terminal and remote terminal, the remote terminal begins to attempt to identify the origin of the telephone call using call source identification information. An example of such information that might be used is the automatic number identification (ANI) service provided by local telecommunications carriers. A database containing ANI information may be at a location that is electronically accessible by the remote terminal that is administrated by the network service provider. This ANI service may be used to inform a telephone call recipient of the originating telephone number for the call. The ANI also includes the name and address of the line subscriber associated with the telephone number.

Once the call source has been identified, the user is then asked to verify his/her age. This age verification step may be performed when the user simply responds affirmatively to a query as to whether he/she is over the age of eighteen. The user is granted access to the network. The user's usage is tracked by the network, and an invoice is prepared according to network usage. The invoice is sent to the line subscriber to the telephone line identified through the ANI.

This system has inherent drawbacks with respect to billing. This system provides no measures for additional verification of the user's identity. The line subscriber may not, in fact, be the network user that incurs network charges. The user could be any person, authorized or unauthorized, using the line subscriber's phone to place calls to the network. Moreover, it is possible that the network user might not even live at the address from which the call originated. In this case, the line subscriber is sent a bill for services accessed by one who does not live in the household. The network service provider might, in this case, incur additional administrative costs in attempting to locate the appropriate invoice recipient. In some cases, the actual user may never be identified or found. Accordingly, not only does the network service provider incur administrative costs while attempting to identify and locate the appropriate invoice recipient, but the expected revenue from the actual user's network usage may never be recovered.

In these systems, additional billing challenges may result when the call source identification (ANI) information is not up-to-date. Under these circumstances, the invoice might issue in the name and address of a previous line subscriber to the telephone number. As noted above, improper invoicing results in increased administrative costs and sometimes, loss of revenue, for the network service provider.

In addition to the shortcomings in billing procedures, the age verification process used in these systems has inherent drawbacks. No further age verification steps are taken beyond the user's affirmative response when asked if the user is over the age of eighteen. Underage users may present additional challenges. For example, in some countries, a debt may be difficult to enforce against a person under the age of eighteen.

Accordingly, the network service provider is likely to lose revenue for network access provided to the minor. Moreover, some networks provide content unsuitable for children. Therefore, even a very young child might have access to content that is strictly intended for adult viewing.

Moreover, because network access is provided without a credit card, the network service provider is essentially extending credit to each of its users. Some systems have addressed this issue by establishing a standard limit for network usage accrued by any user over a predetermined period of time. Treating all users similarly despite past credit performance might not be the most beneficial route. If a network service provider is to provide access to users without a credit card, it is desirable for the network service provider to have some assurance as to a particular level of credit it should extend to a particular user.

As illustrated above, the Internet has been a popular medium for e-commerce. Therefore, various e-commerce transactional and billing techniques have been created based on Internet usage. However, various other media have become increasingly popular for conducting electronic transactions. A notable example of another medium is mobile telephone commerce (m-commerce). Because many potential consumers use mobile telephones, a larger customer base could be reached by making an e-commerce network accessible via mobile telephone.

There is a need for a billing system that incorporates additional protective measures for verifying the proper entity or person to be billed, especially when charges are assessed without a credit card.

There is further a need for user age verification on a network so that minors do not have access to adult content, and so that the network service provider has a better chance of enforcing a debt against a network user.

There is yet further a need for user credit eligibility determination so that a user may be extended credit for network usage commensurate with the user's credit rating.

There is yet further a need for an e-commerce solution that provides access via media other than the Internet, especially via wireless devices.

SUMMARY OF THE DISCLOSURE

The present disclosure addresses the needs noted above by providing a way to manage user accounting and billing transactions over a network. According to the disclosure, the user's identity and age may be independently verified, and a credit rating may be established for the user so that credit may be extended for the purchase of goods and/or services.

In one aspect of the present disclosure, a system is provided for managing accounting and billing of transactions. The system includes a gateway device that is configured to provide access to the e-commerce network subsequent to verification of each required user qualification for network access. A required user qualification is at least one of a minimum age and a minimum credit rating. Verification of each required user qualification is performed by a qualification verification device configured to verify at least one required user qualification based on user qualification input that includes a unique user identifier that may be input from a user terminal.

In another aspect of the present disclosure, a system is provided for managing accounting and billing of transactions. The system includes a remote terminal that is configured to receive a request to access the e-commerce network. The remote terminal further includes a unique user identifier retrieval device configured to retrieve a unique user identifier from at least one database. The system further includes a qualification verification configured to verify at least one required user qualification based on user qualification input. The user qualification input includes a unique user identifier. The at least one required user qualification includes at least one of a minimum age and a minimum credit rating.

In yet another aspect of the present disclosure, a system is provided for managing accounting and billing of transactions. The system includes a remote terminal having a text message source identification device. This text message source identification device is configured to retrieve text message source identification information from at least one database, thereby identifying the source of the text message sent from a mobile communications device. The at least one database includes text message source identification information from more than one text message service provider.

In accordance with yet another aspect of the present disclosure, a method is provided for accounting and billing transactions. The method includes establishing a connection between a user terminal and a remote terminal. The user terminal includes a display device and a user input device. The user terminal is configured to transmit a user request to access an e-commerce network.

The method further includes retrieving call source identification information from at least one database such that the source of the established connection may be identified. The method includes disconnecting the established connection when the call source cannot be identified based on call source identification information.

In accordance with this method, at least required one user qualification is verified based on user qualification input. The user qualification input includes a unique user identifier, and the at least one required user qualification includes at least one of a minimum age and a credit rating.

Access to the e-commerce network is provided subsequent to call source identification and subsequent to verification of each required user qualification. The system receives user selection of a product or service on the e-commerce network. E-commerce network usage information is stored, updated and associated with call source identification information. The call source is invoiced based on the e-commerce network usage information.

In another aspect of the present disclosure, a computer program product is provided. The computer program product contains computer executable instructions for managing accounting and billing of transactions over an e-commerce network. When executed by a computer, the instructions cause a data processing system to receive a user communication requesting access to the e-commerce network, the user communication being initiated via a modem.

The instructions also cause a data processing system to retrieve call source identification information from at least one database such that the source of the established connection between the user terminal and the remote terminal via the communication link may be identified.

The instructions cause the system to identify a call source based on call source identification information, if the call source identification information includes an address for the call source. A disconnection occurs of the established connection occurs when the call source cannot be identified based on call source identification information.

The instructions cause the system to verify at least one user qualification based on at least part of a user social security number, if the number is located in the at least one database. The at least one user qualification includes at least one of a minimum age or a credit rating. The instructions cause the system to provide access to the e-commerce network subsequent to identification of the call source, and subsequent to verification of the at least one user qualification.

The instructions also cause the system to receive user selection of a product or service for purchase. The instructions cause the system to store e-commerce network usage information in a record, associate the e-commerce network usage information with call source identification information, and update the according to e-commerce network usage. The instructions cause the system to invoice the call source based on the e-commerce network usage information.

One advantage of the present disclosure is to provide a billing system that incorporates additional protective measures for verifying the proper entity or person to be billed, especially when charges are assessed without a credit card.

Yet another advantage of the present disclosure is to provide for user age verification on an e-commerce network so that minors do not have access to adult content, and so that the network service provider has a better chance of enforcing a debt against a network user.

Still another advantage of the present disclosure is to provide for user credit eligibility determination on an e-commerce network. In this manner, a user may be extended credit for network usage commensurate with the user's credit rating.

Finally, yet another advantage of the present disclosure is to provide e-commerce access via media other than the Internet, especially via mobile or wireless devices.

BRIEF DESCRIPTION OF THE DRAWINGS

These and other advantages, features, and characteristics of the present disclosure will become apparent to one skilled in the art from a close study of the following detailed description in conjunction with the accompanying drawings and appended claims, all of which form a part of this application. In the drawings:

FIG. 1 is a call flow diagram for conducting and billing e-commerce transactions in accordance with one embodiment of the present disclosure.

FIG. 2 is a call flow diagram for conducting and billing e-commerce transactions in accordance with yet another embodiment of the present disclosure.

FIG. 3 is a screen shot of a user interface for the system for managing accounting and billing of e-commerce transactions in accordance with one embodiment of the present disclosure.

DETAILED DESCRIPTION OF THE DISCLOSURE

Figure 4:
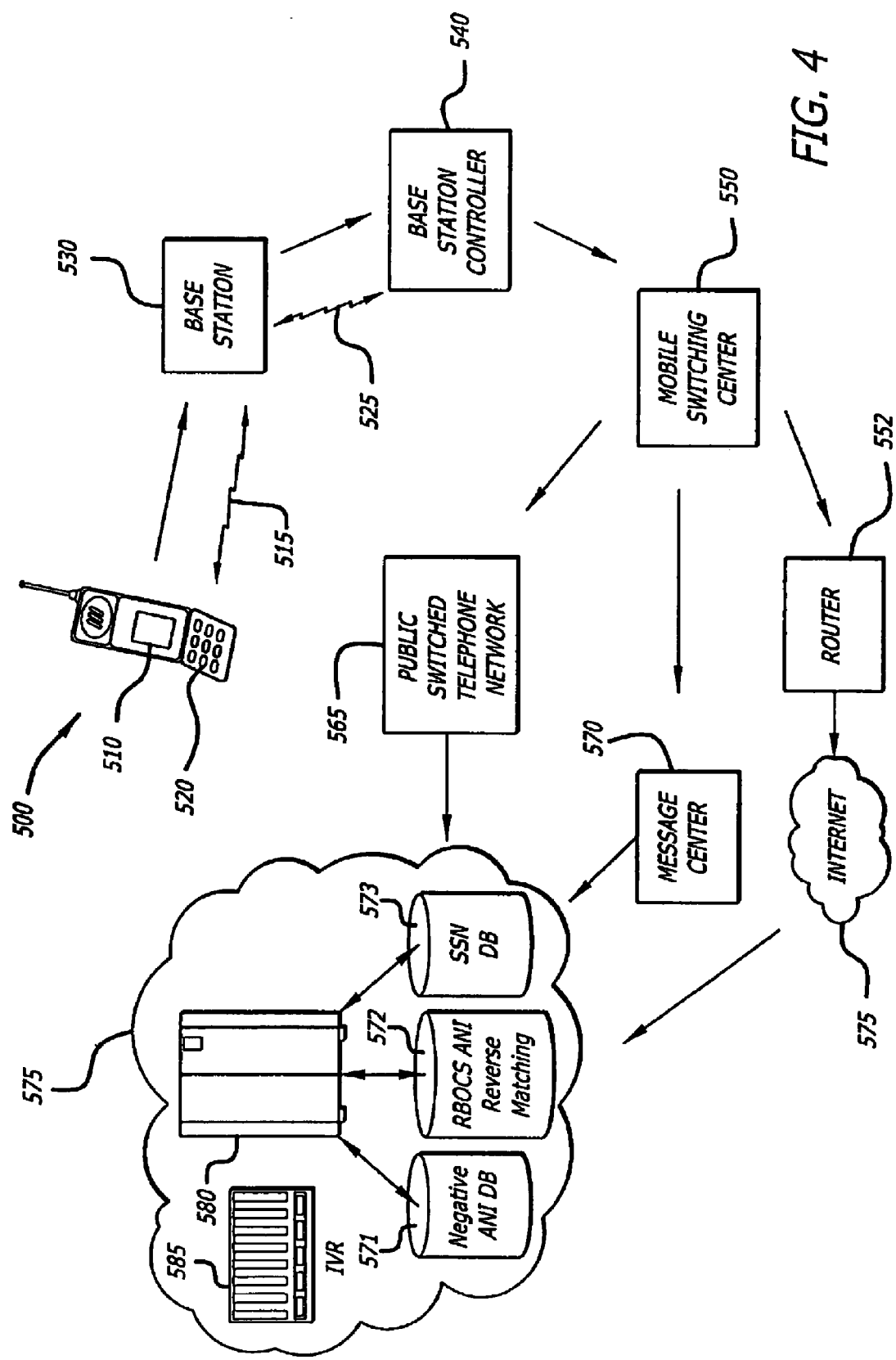
FIG. 4 is an illustration of a call flow diagram for conducting and billing e-commerce transactions in accordance with yet another embodiment of the present disclosure.

The detailed description set forth below in connection with the appended drawings is intended as a description of exemplary embodiments of the present disclosure and is not intended to represent the only embodiments in which the present disclosure can be practiced. The detailed description includes specific details for the purpose of providing a thorough understanding of the present disclosure. However, it will be apparent to those skilled in the art that the present disclosure may be practiced without these specific details.

For purposes of the present disclosure, the term "e-commerce" as used herein includes the conduct of financial or barter transactions by electronic means, including but not limited to the purchase or sale of goods and/or services. The term "e-commerce" as used herein encompasses these electronic transactions, regardless of the electronic media. Such media may include, but are not limited to, digital media (including digital television) and wireless media (including mobile telephone). Such media include the Internet and telephone.

Because the term "e-commerce" includes electronic transactions conducted over mobile telephones, the term "e-commerce" also encompasses transactions conducted through the medium now commonly known as "m-commerce." Examples of goods and/or services which may be the subject of these transactions are videotext, pay television services, magazines, clothing, shoes, music, downloadable software programs, online video, dating services, games, adult entertainment services and online publications such as newspapers and magazines.

Goods purchased over the network may be digital or physical goods. Goods and/or services which were the subject of the purchase may be enjoyed over a number of media, including, for example, a television, a computer or a handheld device. In the present application, goods is used synonymously with products.

The present disclosure may be practiced over an e-commerce network. These networks may include a system of interconnected computers or terminals which share information over one or more communication links, e.g., wired and/or wireless links. These terminals may include laptop computers, desktop computers, WINDOWS® CE® hand-held devices, PDA's e.g., PALMPILOT's, server computers, host computers, client computer, mobile or cellular telephones, and other intelligent devices.

The terminal may include, but is not limited to, any device that incorporates a central processing unit (CPU), which may be provided, for example, as a conventional microprocessor, a read only memory (ROM) for permanent storage of information, and a random access memory (RAM) for temporary storage of information. The terminal may also include a display. Operation of the terminal may be generally controlled and coordinated by operating system software. An operating system resident in system memory and executed by the CPU may coordinate the operation of the other elements of computer system. The computer system may also include storage devices, e.g., a diskette, CD-ROM, hard disk, etc.

The present disclosure relates to a system and computer-implemented method for managing accounting and billing of transactions over public media Information on accessing the network may be obtained over public media, including the Internet, mobile telephone, television or telephone. The user may connect to the network by placing a call from a telephone line. The user may then purchase goods and/or services. The user is invoiced according to the telephone number from which the call originated.

The present system and method may be practiced within the framework of a VOIP gateway or digital line that assigns a unique identifier or personal identification number (PIN) for e-commerce network access. The present system and method may also be practiced within the framework of a remote access server (RAS) that is accessed by a user using a downloadable automatic dialer having code containing a unique identifier.

Regardless of the framework used, the present disclosure includes features for user address verification, user age verification, and a user credit eligibility determination using at least a portion of the user's social security number. The partial or total social security number is cross-referenced with a name and/or address to determine an age found in a social security database for the corresponding social security number. In this manner, the user's address can be verified for billing purposes.

Moreover, the user's age can be verified so that network access is not provided to minors. The partial or total social security number may also be matched with a credit rating contained in a database. This rating is used to determine the user's credit standing so that credit may be extended for the purchase of goods and/or services over the network. The present system and method provide for user billing by including the charges in the user's telephone bill, whether a mobile telephone or otherwise. The user may also be invoiced by paper invoice, e-mail or SMS text message. The present system and method further provide for network access with an automated accounting and billing process.

Referring now to FIG. 1, illustrated is a call flow diagram of system components 100 used in conducting, accounting and billing transactions in accordance with one embodiment of the present disclosure. A user terminal 101 includes a personal computer (PC) 105 operatively coupled to a display device such as a monitor 102. The user terminal 101 further includes one or more input devices such as a mouse 103 and keyboard 104. These input devices 103, 104 are also operatively coupled to the personal computer 105. User PC 105 also includes an internal modem (not shown). Although the modem shown in this embodiment is internal, the modem may also be external. The modem is connected via a telephone cord 106 to a wall jack 107. Although the embodiment illustrated incorporates a telephone jack, it should be understood that any suitable connection may be used, including but not limited to Ethernet, wireless or otherwise.

Software resident at user terminal 105 includes a web browser. Largely due to web browser, the user terminal 105 is capable of receiving one or more web pages which may be viewed at monitor 102. Other software resident at user terminal 105 might include an operating system used to control the execution of computer programs, such as the web browser. The operating system may also provide an interface to peripheral devices such as mouse 103, keyboard 104 and monitor 102.

At user terminal 101, the user views a web page. This web page informs the user of a toll number that can be called to access an e-commerce network. After accepting relevant terms and conditions, the user dials the toll number via the internal modem using a dial-up connection. Toll numbers are generally numbers for which an access fee is charged. As is widely known, telephone numbers in the United States include a three-digit area code followed by a seven-digit number. Currently, toll numbers are distinguished from regular long distance or local telephone numbers in that they often have an area code in the United States of 201 or 900, among others.

Although the United States is used as an example in this description, it should be understood that the telephone number could be in a format used by any country, whether in Europe, Asia or otherwise. Moreover, although a toll number is used in this embodiment, it should be understood that the telephone number may be a toll number or a toll-free number. Use of a toll number may provide certain advantages in that it provides a cross-reference for verification of the length of time connected to the e-commerce network. Time spent on a toll call is usually recorded on a user's long distance telephone bill. If a dispute arose between the network service provider and the user as to the amount of time spent on the network (especially for time-based billing), the long distance telephone bill could be used as an independent verification of time spent for network usage.

In lieu of dialing the toll number from a computer modem as in this example, the user might dial the number directly using a home telephone. Moreover, in lieu of dialing the telephone number, the user may connect to the remote terminal 125 using a broadband connection. As long as the remote terminal 125 detects a modem, such as internal modems commonly found on today's computers, the connection may be properly established.

As illustrated in FIG. 1, the user's call is received by a local telecommunications carrier 110. The call may then directed to the long distance carrier 115 which the user has selected as a long distance service provider.

The call is received at remote terminal 125 and a "wink" occurs upon receipt of the call by the remote terminal 125. This "wink" may come to mark the beginning of a billable event, depending on the relevant terms and conditions agreed to by the user. Through software resident at the remote terminal 125, the remote terminal 125 first attempts to identify the telephone number and address from which the call originated, and the identity of the line subscriber. The remote terminal 125 performs this call source identification by accessing information contained in an RBOC (regional bell operating company) reverse matching database 135. This reverse matching information may be kept in regional and/or local telephone records and/or databases. If the record is found in the reverse match database 135, the remote terminal 125 attempts to determine the status of the identified number and address through the negative ANI database 130. This call source identification assists with proper invoicing.

Status information assists the e-commerce network provider in determining whether the call should proceed. For example, in some cases, the number may be blocked by the line subscriber so that no toll calls may originate from the line. In other cases, the number might be blocked by the network service provider. In yet other cases, the originating number might have exceeded a network established usage threshold. In each of these instances, if the information is found in the negative ANI database 130, the call is dropped by the remote terminal 125 based on this negative information. The device used to automatically disconnect the call may be software resident at the remote terminal 125. The software may be configured to respond to negative status information by triggering a disconnect signal so that the call is disconnected.

In some cases, the call will not proceed as far in the call flow process such that status information is searched by the remote terminal 125. For example, in some instances, the ANI reverse match database 135 does not provide sufficient information to determine the number and address of the originating call. If so, the remote terminal 125 might be configured to try a reverse address match service through a third party vendor over the Internet. This second reverse match process might be performed by contacting and retrieving the information from a third-party server (not shown). TARGUS and EXPERIAN are third-party vendors that provide such a reverse match service. When the remote terminal 125 receives the ANI information from the ANI reverse match database 135, the remote terminal 125 ensures that the record is not duplicated by taking into account the records with similar names. If the last names without the first names match, or the first names without the last names match, the system does not duplicate the record.

If, at the remote terminal 125, it is determined that the customer does not exist in the system based on lack of customer information in the billing system, the system creates a new customer record. If the last call source identification by the remote terminal 125 from the call source was made a significant period of time earlier, such as 60 days, the remote terminal 125 may attempt to re-validate the ANI from the ANI database because the ANI may have changed in such a significant length of time.

If the information is insufficient in both the reverse match database 135 based on regional data and/or the database of a third-party vendor (not shown), the call is dropped because the remote terminal 125 cannot verify billing information or identity information, such as the user's name and address. If the user's address and name are verified, the call proceeds to an interactive voice response server 145 over a voice-over internet protocol (VOIP) gateway, which handles preambles, voice prompts and tone recognition. This interactive voice response server 145 assists with verifying the user's age. This interactive voice response server 145 also centralizes the issuance of personal identification numbers (PINs) which will be issued after all required user qualifications are met.

Various problems are encountered with minor-originated calls, making age qualification a desirable step in permitting network access. For example, some network-accessible web content may not be appropriate for minors. Also, charges accrued based on a minor's network usage may be difficult to collect since the debt might not be legally enforceable against the minor. It might be desirable to confirm age prior to providing access to the e-commerce network.

Accordingly, an age verification process may be performed based on a portion of the user's social security number. The interactive voice response server 145 prompts the user to enter at least a portion of the user's social security number. The social security information that was entered by the user is sent to the internal cached social security database 140 at remote terminal 125.

The partial social security number should match that found in the internal cached database 140. Through software located at remote terminal 125, the remote terminal 125 first attempts to validate the partial social security number, which may be four digits of the entire social security number. If the four-digit social security number is not valid, the user may retry with different digits. Once the four-digit social security number is validated, the remote terminal 125 checks the internal cached database 140.

If an age record meeting qualification requirements is found in this cached database 140 that corresponds to the input partial social security number, the remote terminal 125 determines that the user is of sufficient age. The remote terminal 125 performs this process by comparing and matching the partial social security number in the cached database 140 with an age associated with that social security number. If the record is found and the user's age is greater than eighteen, the user is allowed to view the premium content. The user's call is then connected to the web site 150 that includes the premium content. The user may then view the premium content at the monitor 102, located at user terminal 101.

If the age verification process fails after a few attempts to verify the social security number, the system has yet another backup system for age verification. The user may be prompted to enter additional information such as driver's license number, the date of birth or full name to perform a final validation before the call is disconnected. This additional information may be cross-referenced with yet another database to ensure proper identity. If this age validation step proceeds, the call proceeds. It should be noted that a number of qualifiers could be established by the network, e.g., age. Moreover, a particular credit rating might be a qualifier.

With the user's age having just been verified—his identity and address having previously been verified—the user is given a personal identification number (PIN). The PIN allows the user to connect to site content without disconnecting from the user's Internet service provider (ISP). The PIN might be, for example, an eight-digit number. For minute billing, the user might need to stay on the phone without disconnecting from his/her ISP in order for the PIN to be active.

Using the PIN has several advantages. First, a PIN number might provide for additional privacy in light of others who might review the invoice sent to the address associated with the ANI. When the user enters his PIN, he might agree that he'd like to be billed in units. The goods and/or services purchased by the user with the units would be known only to the user. The units essentially act as tokens to be used within the system. For each unit, the user would be charged a fixed amount. Moreover, a user might share an e-mail account with another use. If the user has chosen to be invoiced by e-mail, the user might not wish for others who use the account to view the invoice details. The unit billing provides privacy in this respect, also.

The call then proceeds to web site 150. This web site contains the good and/or service that the user has requested. At this point, the user's communications session commences. Time-based billing also commences and continues until the user disconnects from the web site.

The user might purchase goods and/or services at this point. For example, the user might purchase a pay television program. This type of ordering service might be particularly useful where the user's regular cable service provider does not provide the program at issue. The user might agree to have the television program placed on the user's telephone bill. The remote terminal 125 updates the user's call detail record, and the user is invoiced for the charges. The user may make subsequent purchases of goods and/or services using the PIN or password that was issued. The user may also be issued a user identification (ID).

For time-based billing, it might be desirable for the remote terminal 125 and pertinent software to track the per-minute e-commerce network usage of each communication session as identified by the ANI. In order to ensure that excessive charges are not incurred, the remote terminal 125 might disconnect a single communications session after a certain time threshold, for example, when the time for a single call exceeded 31 minutes. Alternatively, the time usage could be tracked for more than a single session. For example, when a user's communications session(s) for time-based usage exceeds 93 minutes for a single month, and this 93 minutes is reached while the user is viewing the premium content, the call could be disconnected. Where the user is invoiced based on minute usage, the number of minutes is multiplied by the appropriate rate in order to obtain the charged amount. Each user is invoiced based on a unique identifier corresponding to the call source identification information.

In some cases, such as where a call source is billed on a monthly basis, it might be desirable for the interactive voice response server 145 to deactivate the PIN at the end of the month's period or any other time period desired.

The user may be billed on a transaction basis, where the user is charged a set amount for a single transaction, such as a single call or service. In this case, the billing module at remote terminal 125 will designate a fixed charge for each unit billed.

The billing module also includes a tax table for the application of pertinent federal, state, local and other taxes and/or fees. The taxes and/or fees may be assessed based on the call source identification information as well as the premium content requested by a user. The taxes and/or fees may also be based on the location of the vendor of the good and/or services. These taxes and/or fees may be calculated and assessed according to rules for particular government authorities.

At the billing module accessible by remote terminal 125, a credit may be allocated against the bill for vendor or network promotions (as indicated by a promotion code which can be input by the user). The billing module accessible by remote terminal 125 might also record credits against the amount invoiced according to discounts, refunds or credits. Charges against the user's call detail record may be credited according to a promotion, discount, refund. The credit amount may also be based on courtesy extended by the network service provider, a dispute initiated by a line subscriber or otherwise. A voucher processing module of the software may be used to track and post vouchers related to credits/adjustments. The voucher processing may also be a result of reversals of payments, chargebacks as well as accounting for payments received for which sufficient funds were eventually deemed unavailable.

The billing module includes software that notates and updates accounts for which returned mail has been received. This return mail management module may be used to notate and update accounts where outbound correspondence has been returned by a postal service (including the United States postal service) as undeliverable. The correspondence might include bills and letters as well as other correspondence. The return mail management module allows the remote terminal 125 to be queried at a later date so that no further correspondence is mailed those identified accounts for which return mail has been received.

The billing module may operate in accordance with billing rules. The billing rules may include default billing rules for all call sources, or billing rules specified for a particular call source. The billing rules might for a call source might include information related to the number of days in a bill cycle, start and end dates for the bill cycle, a minimum bill amount, payments received from the call source where insufficient funds were available, the number of due dates for a bill cycle, the number of bill cycles before a reminder invoice is sent, the number of bill cycles before collection activity is instituted, and a date that the billing rules for a call source were modified.

Each invoice generated by the billing module includes a unique identifier for the invoice. The billing module may also determine whether a standard bill or a reminder bill should be generated for a particular account. The determination is made based on whether new charges exist for the account and/or whether the account is due for a reminder based on current billing rules.

The user may pay the invoice via credit card, check-by-phone, debit card, check by mail, e-wallet or any other payment method. The charges may also be set up, subject to user approval, so that the charges are automatically debited from the user's credit card or debit card account each month.

Payments may be recorded for a call source, whether received from an outside vendor or otherwise. The outside vendor may include a collection agency, a call center or otherwise. The system includes software that processes payments according to processed data which may be received from such an outsourced vendor or directly to the system and stored in a data file. The method and source of the payment may also be included. The methods and sources may include payments from a lockbox or safe deposit box owned or used by the network service provider. The methods and sources may also include payments pre-paid to the network service provider. The methods and sources of payments may also include credit card payments made through the remote terminal, checks by phone received by a call center, payments mailed and posted to the system, and collection payments received by an outside collection agency.

Software modules executable by the remote terminal 125 may also generate standard account-related letters based on templates accessible by the software modules. The account-related letters may be viewed by the user at the user display 102 and/or mailed to the user at the address ascertained from the user's call source identification information.

These standard letters may indicate the remote terminal 125 has insufficient information to determine whether the user is of sufficient age, that the remote terminal 125 has determined that the wrong person has been billed for this user's access, that the user has a zero balance, that the account is in precollection status, or that the user has requested a duplicate invoice (in which case, the invoice would generally be attached). The standard letters might also be generated in response to a consumer inquiry. Due to the routine nature of some consumer inquiries, the system might have a standard response for any inquiries deemed desirable.

The standard letters may indicate any other information based on network usage deemed pertinent by the administrator of the network service provider. Network usage information includes any information related to user communication sessions, such as information relating to the amount owed for network usage, and status information obtained from a negative database. The letters may be generated by an administrator or customer care representative for the network service provider or any other person or entity deemed appropriate by the network service provider.

Through software executable by remote terminal 125, the system may also generate custom letters based on account activity. These custom letters might be generated based on content input by the network administrator, a lawyer for the network service provider or otherwise. These custom letters may be viewed by the user at display unit 102 and/or received at the address corresponding to the call source identification information.

Software executable by remote terminal 125 further includes a collection module for initiating, tracking and recording collection activity. The collection module may include information such as the name and address of a collection agency, the contact information for an identified contact within the collection agency, a list of accounts assigned to particular collection agencies, a list of accounts recalled from collection agencies and payments made through collection agencies.

Software executable by remote terminal 125 may also include an account detail module that includes a notes history on the user's account. These notes may include information related to the payments posted to a user's account, credits and insufficient funds for payment. The account detail module may further include information related to invoice history and a history of letters generated for the account.

Software executable by remote terminal 125 may also include a report generation module that can be used to generate and compile various reports for administrative purposes. The reports may be designed for generation at the request of a network administrator, or employee for the network service provider. The network administrator and/or employee request generation of the reports through a graphical interface provided by software executable by remote terminal 125. The report may be displayed on the terminal used by the network administrator or employee.

The types of reports that may be requested by the network administrator include general financial reports related to payments received by the network service provider over an administrator-specified period of time, accounts receivable changes and updates, or payments and vouchers posted to all or certain accounts. The administrator-requested financial reports may also include payment tracking reports which provide information as to the payments received over a period of time, the payments for a particular call source, credit card payments, payments for an account sent to a collection agency, payments where insufficient funds were available, chargebacks to the network service provider.

The administrator-requested reports may also indicate the number and types of bills generated, including those generated in response to particular dialer campaigns for a particular owner or operator of a web page including premium content as indicated by the unique identifier associated with the owner or operator. This unique identifier may correspond to a particular PIN assignment. For example, PIN numbers in a certain range may be given to users who wish to view particular web pages containing premium content. Alternatively, as indicated in greater detail below, the unique identifier may be transmitted along with code in dialer software that is transmitted upon dialing the remote terminal so that premium content may be accessed.

The administrator-requested reports might also include reports summarize the standard bills, reminder bills and rebills generated by the remote terminal 125. Rebills might include bills that were re-sent because the original invoice was sent to the wrong person. These administrator-requested reports might further include block ANI reports (also known as block call reports), which report information related to call sources that have requested that calls originating from their telephone lines be blocked from network usage. For example, a line subscriber or other authorized person might unsubscribe from the service. The network service provider may have also determined that calls from a particular number should be blocked. Also by way of example, these reports might be generated where the user is a minor or the wrong person might have been billed for charges. Other reports generatable by the administrator may include reports related to collection tracking, e.g., the accounts placed with collection agencies, the amount and number of collection payments for a particular account or accounts, and a collection agency's performance.

It should be understood that an employee could also be an administrator, and therefore privy to these types of reports. The remote terminal 125 includes in a storage device, information related to this more enhanced access. For example, user identification codes and/or passwords corresponding to these enhanced access rights may be stored at remote terminal 125. Upon administrator input of the identification code and/or password associated with these enhanced access rights, the remote terminal 125 verifies these enhanced access rights and the requested report is generated and compiled.

Access rights may also be granted according to department or title. For example, a system administrator might have full system access and full modification rights to the system. A manager might have information access rights limited to customer information, complete reporting rights and limited record modification rights. An accounting employee might have full modification rights for account-specific tasks.

Non-employees acting on behalf of the network service provider may also have access to the network. For example, a legal representative for the network service provider might have access to a full complement of customer information, but limited reporting rights.

Other reports might relate to employee performance tracking, e.g., payment and letter processing performed by an employee.

Software executable by remote terminal 125 and storage accessible by remote terminal 125 may also include and process information related to customer care. The customer care information may include work schedules for customer care representatives. Information that may be processed related to customer care may include incentive programs for customer care representatives. Other such processable customer care information may include reminder queues to remind the appropriate customer care representative on a particular date that certain actions are to be taken. Such actions might include a reminder to change login rights. Such actions may also include records related to recording and tracking return mail or noting customer address changes.

As illustrated, the present disclosure includes an automated billing and accounting system that handles many routine activities on an automated basis. Although the software that handles many of these activities is executed by a remote terminal 125 in this embodiment, it should be understood that the software could be executed by any one or more computers or terminals suitable for performing these actions. These computers or terminals could be located at any place accessible by the system.

Referring now to FIG. 2, illustrated is yet another embodiment of a call flow diagram that incorporates components of the system 200 for conducting and billing e-commerce transactions. This embodiment incorporates a dialer that is downloaded from the Internet. This dialer is used to dial the access number and reach the premium web content.

Moreover, in lieu of voice over internet protocol, this embodiment incorporates a remote access server (RAS) which recognizes the dialer's unique identification number associated with a web site the user wishes to view. This remote access server assists in routing the user to the appropriate web site. Finally, this embodiment incorporates functionality through which a qualifier in addition to age is used. The qualifier is a credit rating with which the user might be permitted access to tiered credit services for system usage. Agreements with financial institutions to extend such credit have been pre-arranged, and where a user has a credit rating as found from a third-party server such as EXPERIAN, the user is essentially pre-approved for a certain credit line.

The present disclosure provides for private network access by a user through information obtained from a public network, e.g., the Internet. The information may be obtained by the user when viewing a web page at user terminal 205.

User terminal 205 includes a personal computer 225 operatively coupled to a display device such as a monitor 210. The user terminal 205 further includes one or more input devices such as mouse 215 and keyboard 220. These input devices 215, 220 are also operatively coupled to the personal computer 225. User terminal also includes a modem 230. The modem may be internal or external. In this illustration, the modem is external. Software resident at user terminal 205 includes a web browser. Largely due to web browser, the user terminal 205 is capable of receiving one or more web pages. Other software resident at user terminal 205 might include an operating system used to controls the execution of computer programs, such as the web browser. The operating system may also provide an interface to peripheral devices such as mouse 215, keyboard 220 and monitor 210.

While viewing the web page at user terminal 205, the user is given information regarding access to the private network by dialing a toll number. By dialing this toll number, the user will be permitted to access a downloadable automatic dialer.

In lieu of dialing a toll number and/or accessing an automatic downloadable dialer, the user might simply browse the Internet and view the web page of a merchant affiliated with the e-commerce network. The user might request purchase of a particular good and/or service. Instead of using a credit card, the user might simply choose to dial the e-commerce network by selecting a button on the screen. Entering the network in this manner would not require the user to download the automatic dialer. The button might read for example: "Teletransact".

As part of the initiation of the download for the pertinent dialer software the user would press an "I agree" button prior to being permitted to download the dialer software.

The user may then download automatic dialer software to the user terminal 205. The automatic dialer software is then used to dial the appropriate toll number. The downloadable automatic dialer software of the present disclosure is used to dial a toll number from the user's telephone line. This dialer software incorporates a unique identification number that corresponds to the premium web content that the user has requested. For example, the initial web page viewed by the user might indicate that the user can view web pages from a company that sells apple tarts. The user would download the dialer that corresponds to the apple tart vendor. The unique identification number in the dialer software would correspond to the apple tart vendor. When the user uses the dialer to dial the apple tart vendor, the unique identification number would be transmitted to the remote terminal 250 as described in more detail hereinbelow.

Through the communications link (or telephone line) between the user terminal 205 and remote terminal 250, a connection for the toll call is established. First, the call is received from by the user's local telecommunications carrier 235. Examples of such local telephone carriers are VERIZON, SBC, and ATX. The call is forwarded from the user's local telecommunications carrier 235 to the user's long distance carrier 240. Examples of such long distance carriers 240 that provide long distance service are AT&T, MCI and SPRINT. Of course, some local telecommunications carriers 235 also provide long distance service. In this case, the call might be forwarded from one portion of a single network to another portion of the same network. The call might then be forwarded from the user's selected long distance carrier 240 to yet another carrier 245, depending on how access to the remote terminal is routed.

If the user's call is accepted, the call is routed to the remote terminal 250.

Remote terminal 250 is operated and administrated by a network service provider capable of providing access to the private network that the user wishes to access. As soon as a connection is established between the user terminal 205 and remote terminal 250, the remote terminal 250 begins to attempt to identify the origin of the telephone call using call source identification information. An example of such information that might be used is the automatic number identification (ANI) service provided by regional and/or local telecommunications carriers. This ANI service is used to inform the recipient of a telephone call of the telephone number of the person making the call. The ANI also includes the name and address of the subscriber associated with the telephone number.

The ANI database resides at a location that is accessible by remote terminal 250. The remote terminal 250 screens the ANI and gives the call a timestamp, thereby noting the time of the call for billing and recordkeeping purposes.

A mediation platform resident at the remote terminal incorporates proprietary software; this platform is used to retrieve call source identification information from the remote terminal 250. This software is generally resident at the remote terminal 250, but may be at any location accessible for execution by the remote terminal 250. If the call source identification information is located by the remote terminal 250, the remote terminal then attempts to determine the status of the ANI.

Status information may include information retrieved from a negative database 255 accessible by the remote terminal 250. Such negative information might include exceeding an established time threshold for private network access, or when calls originating from a telephone number identified by the ANI have been blocked by the network service provider or the user. Based on negative information found in negative database 255, the remote terminal 250 may indicate and display to a user at user terminal such restrictions on the login rights of a user.

One example of such negative information is where the network service provider may have established a 90 minute threshold for calls received from a telephone number so that a large bill is not generated for callers. Generally, the higher the bill, the less likely the bill is to be paid. A minute threshold may be established by an network service provider in order to reduce the likelihood of an unpaid bill.

Calls might be blocked, for example, when a line subscriber has requested that toll calls be blocked from his or her telephone line. This might protect a household from unauthorized use by an adult or minor of their telephone line, thereby running up charges which might be assessed against a line subscriber. The present disclosure provides additional authentication measures such as this as will be described in greater detail hereinbelow.

Negative information might also include whether the account is active, inactive, in the collections process or in dispute.

It should be understood that the types of negative information are network-specific to the private network and are based on the policies of the service provider of the private network. Therefore, any one of a number of types of negative information might be defined and enforced by the network service provider.

If the remote terminal 250 cannot locate internally the call source identification information based on the originating telephone number, it attempts to do a reverse address match using a reverse address match database 260. The address service might be retrieved internally, or it might be retrieved from a third-party vendor such as EXPERIAN or TARGUS. If the network service provider. The reverse address match service might be accomplished where the line subscriber's address is found internally based on the call source identification information, but the information is insufficient for network billing purposes. For example, the line subscriber's name might not be found. If there is no match for the address, software located at the remote terminal 250 disconnects the call. The connection established between the user terminal 205 and remote terminal 250 would thereby be dropped because the source or origin of the established connection could not be verified properly.

If the remote terminal 250 matches the address with another that is associated with a name, the information is cached and stored by the remote terminal 250 so that it is accessible for future internal use. This way, the remote terminal 250 can retrieve the information internally without making use of third parties. The call then proceeds to a gateway 270 which handles web content of the private network.

In this embodiment, the gateway 270 is a remote access server (RAS). The RAS recognizes the unique identifier in the dialer software, and routes the call to the proper uniform resource locator (URL) which represents the world wide web address for the vendor. Under these circumstances, the age verification must be performed before the RAS.

Because the web content is the last critical phase of the access procedure, additional procedures might be employed so that the network service provider is further assured that the user is entitled to access. For example, the network service provider might wish to verify that the user is of legal age, or the network service provider might wish to establish creditworthiness of the user. Age is a qualification which, if not met, will result in no access to the private network. Creditworthiness is a qualification which, if not met, might result in lack of extension of credit for purchases of goods over the private network.

Before allowing access to web content, the gateway 270 might employ a qualification verifier to handle these critical procedures. This verifier might be in the form of software resident at gateway 270, or at a location accessible by gateway 270 or remote terminal 250. In one embodiment of the present disclosure, the user is asked to input the last four digits of the user's social security number. Alternatively, the user might be requested to input his or her entire social security number. The user's social security number might be used to verify both the user's age as well as the user's creditworthiness. Whenever sensitive information, such as social security numbers are used, encryption software might be used so that the user's sensitive personal information is not intercepted.

Once the user's social security number is input, this information is sent to the remote terminal 250 for validation. If the social security number cannot be validated upon the first attempt, the user is given a couple of additional attempts—three total attempts—to enter a proper social security number. The social security number of the user is cross-matched with call source identification information found at remote terminal 250. In this manner, the user's age might be verified. At this point, if the network service provider simply wishes to verify age, the user might have already proven this qualification based on information contained in internal databases at remote terminal 250.

However, where qualifiers such as creditworthiness need to be determined, the network service provider might connect to a third-party database resident on a third-party server 275 in order to obtain a user's credit rating. Under these situations, the network service provider merely acts as an interface between the user, a credit agency, a financial institution and a merchant whose premium web content is viewable on the system. Essentially, the financial institution would lend money to the user by making the money accessible to the network service provider and/or vendor for goods purchased on the e-commerce network.

The network service provider, through its prearranged agreement with the financial institution, would essentially agree that it would receive the money with a commitment that the money would be paid by the network service provider to the merchant. The network service provider would stand to lose this money if it is not repaid by the user. Accordingly, the network service provider might also charge interest if money extended by a financial institution based on a user's credit rating is not repaid in a timely manner.

If the remote terminal 250 is able to validate that the user has met all qualifications based on internal and/or third-party vendor information, it allows the user to view the premium web content, and the user has passed all entry hurdles.

If the remote terminal 250 cannot validate the qualifying information based on the user's social security number, the remote terminal attempts to retrieve the information from a third-party vendor.

The call detail record is stored at remote terminal 250 and used in the invoice process. In lieu of being stored at remote terminal 250, the call detail record may be stored at any location that is accessible by remote terminal 250. Protective measures are put into place in order to ensure that these records are accurate. The call detail record includes certain protections to make sure that a user is not billed twice for the same call. For example, the ANI could be checked against the date and time of the call from the timestamp. If two calls having the same date and timestamp originate from the same call source, the call detail record will not duplicate the charges for this call. Where a user is billed for time-based usage, the call detail record also updates calls according to the to the minute usage rounded up to the next full minute.

The user may be issued a user identification and a password during the registration process. This user identification and password may be used for subsequent purchases over the e-commerce network. The user may also be required to enter an e-mail address upon registration so that future invoices can be e-mailed to the user. Entering an e-mail address might also allow the user to be invoiced by e-mail. For example, the user might agree to be invoiced by e-mail upon registering. Moreover, this option might be displayed to the user any time the user enters the system. E-mail might also be used to send a confirmation to the user each time the user conducts a transaction.

Referring now to FIG. 3, illustrated is a screen shot 300 of a web page that might be displayed by the system after a user has been issued a user identification and password and has registered with the e-commerce network. As illustrated, the screen shot 300 includes customer information 310, account information 320 and relevant terms and conditions 330 to which the user must agree to each time the user accesses the e-commerce network.

In the present embodiment, the relevant terms and conditions include user agreement that the user is the line subscriber for the relevant telephone line from which the call is being placed, that the user is over the age of eighteen (18), and an agreement to be charged a particular rate per minute for network usage. The terms and conditions might also require the user to agree that the e-commerce network has the right, justification, entitlement, permission and authorization to send the user future invoices for any e-commerce network usage.

The screen shot 300 also includes information related to a user's account detail 350, reference information 360, account action 370 and accounts receivable action 380. Account detail may include in a submenu one or more interfaces for accessing details on a user's account, including but not limited to, interfaces to notes history 352, invoice history 354 and letter history. If the reference information 360 interface is selected by user input to the appropriate icon, information related to billing for toll number, frequently asked questions and other reference information might be accessed by the user. Information on how to uninstall the downloadable dialer software might also be accessed by the user. The user would press the "I agree" button 340 and be permitted access to the system.

User billing might be displayed to the user in a number of ways. For unit billing, only the user would be privy to the description of the product or content purchased or accessed. The user would only be able to access this description using the password and unique user identifier that was issued upon registration.

An invoice summary based on unit billing may include the date and time of the transaction. The date and time of the user's transaction was recorded based on the date and timestamp of the call detail record. The invoice summary may also include the quantity of tokens used. The description of the type of token may be displayed. Each token may be given a particular worth, just as particular denominations of dollars might be assigned a particular worth. The price per unit for the token consumption might be displayed, as well the total currency amount represented by the tokens in the currency of the user's choice. The user may have agreed to be billed in a certain currency upon registering. The tokens may represent United States dollars, Eurodollars or any other currency to provide flexibility. The total amount of the user's invoice may also be displayed.

The user may be invoiced by regular mail, e-mail or any other type of invoice method.

Referring now to FIG. 4, illustrated is a call flow diagram in accordance with yet another embodiment of the present disclosure. In this embodiment, the user is capable of accessing an e-commerce network with a wireless mobile telephone 500. The mobile telephone 500 includes a display screen 510 and a keypad 520. The mobile telephone 500 is configured to send and receive text (or SMS, i.e., short message service) messages through software resident at said mobile telephone 500. When text messages are received, they are displayed on mobile display screen 510.

The mobile telephone 500 may be operable within GSM (Global System for Mobile Communications). A SIM (subscriber identity module) may be carried by the mobile telephone and may be releasably coupled thereto. The SIM may include a processing device. The processing capacity of the SIM in procedures by which the wireless service provider of the mobile telephone 500 is authenticated. This authentication permits communications between the mobile telephone service provider (which also provides text message access in this embodiment) and the e-commerce network. It should be understood that, although this embodiment incorporates a mobile telephone, that any wireless device having text messaging capabilities could be used.

Algorithms forming applications executable upon the processing device cause, e.g., the mobile terminal 500 to transmit an SMS message or cause data to be displayed upon a display element (not separately shown) of the mobile terminal. Resident within mobile telephone 500 is a microprocessor, random operating memory (RAM), random access memory (ROM), and a handset controller. Optionally, the mobile telephone 500 might also be web-enabled and includes web browsing capabilities. Of course, the user must subscribe to the pertinent web services in order for the mobile telephone to send and receive web pages.

At user mobile phone 500, the user views information that informs the user of a telephone number that can be called to access an e-commerce network. The telephone number is assigned to an e-commerce goods and services provider and the number may be linked to one or more goods and/or services. The e-commerce access number may be received at user mobile telephone 500 by short message service (SMS), a text messaging service for cellular telephones. It should be understood that the user could also receive this information (i.e., the telephone number and pertinent goods and/or services) through any other media, including the Internet, advertisement in a catalog, television, advertisements sent with the user's mobile telephone bill or otherwise.

The user may respond to the merchant communication by sending a text message via as SMS that allows the user to agree to be billed in SMS units. For example, the user may agree to be billed in units, e.g., $4.99 per unit. Alternatively, the user may agree to be billed in minutes as set forth hereinabove. When the text message is sent, the message is routed in a manner similar to mobile telephone calls, i.e., via wireless communications link 515 to a base station 530. The message may then be forwarded via wireless link 525 to a base station controller 540. The base station controller 540 generally routes the call to a mobile switching center 550.

The MSC 550 may, in turn, route the communication any number of routes, depending on the type of communication. The communication may be routed to either a public switched telephone network (PSTN) 565, a message center 570 or the Internet 575.

Because the user has sent a text message, the communication is routed to the message center 570. An SMS (short message service) center 570 permits messages generated at the private network to be formed into SMS messages at the SMS center 570. SMS messages are transmitted upon a control channel, in conventional manner, as defined in the GSM standard specification. From the message center 570, the user's text message would be routed to the e-commerce network 575.

Where the user has seen an advertisement on Internet or television, the remote terminal 575 may respond by sending a return text message that includes a password and user identification for login purposes. The source of the text message, negative status information and social security information may be retrieved by the remote terminal 575 for identification, age verification and credit eligibility as set forth herein. The user may then purchase the pertinent goods and services.

Where the user accesses the goods by returning a text message as opposed to viewing the information on the Internet or television, the user need not necessarily obtain a password.

The user may simply agree to be billed in SMS units, place the order and receive the invoice as part of the user's regular mobile telephone bill.

If the user calls to receive a PIN as opposed to sending a text message, a cellular phone service provider, e.g., AT&T WIRELESS, or SPRINT might assign to the e-commerce access provider a single telephone number or range of numbers. Accordingly, when the user places a call to the pertinent access telephone number, the user is accessing a network that is intended solely for the e-commerce access provider.

PSTN networks have been evolving over the last century and is currently a mixture of old and new circuit switched technologies. The PSTN network mainly provides point-to-point interactive two-way voice communication services. If the user places a telephone call to reach the e-commerce network, the user may be routed through the PSTN 565. If the user's phone is web-enabled, the user's call may be routed through the Internet 575.

In yet another possible routing process, the call may be routed to a circuit-switched network, for example, where the cellular service provider has established a dedicated physical circuit into a service carrier's network (not shown). A mobile switching center (MSC) 550 may provide switching capabilities that route the call to the circuit switched network. Integrated service digital network (ISDN) telephone lines are common examples of circuit-switched technology.

As previously described, in lieu of sending and receiving text messages, the user may enter the e-commerce network by calling to receive a PIN. Therefore, after accepting relevant terms and conditions, the user would dial the number provided by the e-commerce network provider. The call would be passed to base station 530, base station controller 540, mobile switching center 550, to a PSTN 565, and finally to the remote terminal 580 within the e-commerce network 575.

Through software located at the remote terminal 580, the remote terminal 580 first attempts to identify the telephone number and address from which the call originated and the identity of the subscriber to the text message service or mobile telephone service. The remote terminal performs this caller identification by accessing information contained in a call source identification database 571 that includes the mobile telephone numbers and/or text message address which are cross-referenced with the pertinent cellular telephone subscriber. The e-commerce network provider might have an agreement with a number of cellular telephone service providers so that these service providers provide this information to a database accessible by remote terminal. If the line subscriber's record is found in the call source identification database 571, the remote terminal 570 attempts to identify the status of the identified number and address through the negative database 572.

Status information assists the e-commerce access provider in determining whether the call should proceed. As described above, the originating number might be blocked by the user or the telephone service provider, or calls from the originating number might have exceeded a network-established usage threshold. In each of these instances, if negative information is found in the negative database 572, the call is dropped by the remote terminal 570 based on this negative information.

In some cases, the call will not proceed this far if the call source identification database 571 does not provide sufficient information for the number and address of the originating call.

If, at the remote terminal 580, it is determined that the customer does not exist in the system based on lack of customer information in the billing system, the system creates a new customer record. If the last call received by the remote terminal 580 from the call source was made a significant period of time prior to the current calls, such as 60 days prior, the remote terminal 580 may attempt to re-validate the call source information from the call source identification database 571 because the call source identification information may have changed in such a significant length of time.

If the user's personal information is verified, the call proceeds to an interactive voice response server 585 over a voice-over internet protocol (VOIP) gateway, which handles preambles, voice prompts and tone recognition. This interactive voice response server 585 assists with verifying the user's age. The age verification process may be performed as set forth hereinabove by matching a partial or full social security number that is input from keypad 520 at the behest of interactive voice response server 585 with information found in the social security database 573.

Also as set forth above, another database (not shown) such as one administrated by EXPERIAN or TARGUS may be used to assist with age validation and/or credit eligibility.

The user is given a personal identification number (PIN). The PIN allows the user to connect to site content without disconnecting from the user's Internet service provider (ISP). The PIN might be, for example, an eight-digit number.

The user may also be billed in units according to the goods and/or services purchased. The units may include a token, voucher or other form of online currency or credit. In this case, the user may have agreed to unit billing. The user may use his mobile telephone 500 to order available goods and/or services. The units essentially act as tokens to be used within the system. For each unit, the user would be charged a fixed amount on the user's cellular telephone bill.

The method and system have been described with reference to certain exemplary embodiments. However, it will be readily apparent to those skilled in the art that it is possible to embody the method and system in forms other than these embodiments. This may be done without departing from the spirit of the disclosure. The embodiments are merely illustrative and should not be considered restrictive in any way. Moreover, it should be understood that any software module described herein may be contained in a stand-alone or combined with other software modules. The scope of the method and system are given by the appended claims, rather than the preceding description, and all variations and equivalents that fall within the range of the claims are intended to be embraced.

The invention claimed is:

1. A computer-implemented method for managing of transactions over an e-commerce network, comprising:
    obtaining source identification information from a third-party server via a communication network, the source identification information corresponding to an identity of a user of an e-commerce network;
    receiving a user credit rating for the user via the communication network based on the source identification information;
    verifying at least one required user qualification for usage of the e-commerce network in response to user qualification input provided by the user, wherein the user qualification input includes a unique user identifier and, wherein verification of the at least one required user qualification is based on the user credit rating;
    receiving, via the e-commerce network, e-commerce network usage information relating to a purchase of a good or a service by the user;
    providing approval for the e-commerce network usage based on the verification;
    storing the e-commerce network usage information in a record, including updating the record relating to e-commerce network usage, and further including associating the e-commerce network usage information with the source identification information; and
    invoicing the user based on the stored e-commerce network usage information and the source identification information,
    wherein the above steps are performed by one or more computers programmed to perform the above steps.

2. The method as recited in claim 1, wherein the step of verifying at least required one user qualification based on user qualification input provided by the user terminal includes the step of:
    requesting user input of at least part of a social security number.

3. The method as recited in claim 1, wherein the e-commerce network usage information includes an amount owed for the purchase of the good or the service.

4. The method as recited in claim 1, wherein the source identification information includes a mailing address for the user.

5. The method as recited in claim 4, wherein the source identification information further includes the user's name.

6. The method as recited in claim 1, wherein the user qualification input is provided by the user via a mobile telephone.

7. A non-transitory computer program product containing computer executable instructions for managing accounting and billing of transactions over an e-commerce network, which, when executed by a computer, cause a data processing system to perform the acts of:
    obtaining source identification information from a third-party server via a communication network, the source identification information corresponding to an identity of a user of an e-commerce network;
    receiving a user credit rating for the user via the communication network based on the source identification information;

verifying at least one user qualification for usage of the e-commerce network based on at least part of a user social security number provided by the user, if said part of a user social security number is located in the at least one database, wherein verification of the at least one user qualification is based on a user credit rating;

receiving, via the e-commerce network, e-commerce network usage information relating to a purchase of a good or a service by the user;

providing approval for the e-commerce network usage based on the verification;

storing the e-commerce network usage information in a record, including updating the record relating to e-commerce network usage, and further including associating the e-commerce network usage information with the source identification information; and invoicing the user based on the stored e-commerce network usage information and the source identification information.

8. The computer program product as recited in claim 7, wherein the step of verifying at least one user qualification based on at least part of a user social security number provided by the user terminal, includes the step of:

receiving user input of the at least part of a social security number at an interactive voice response server configured to interact with a user through a voice telephone connection and, wherein the interactive voice response server is further configured to request user input of the social security number.

9. The computer program product as recited in claim 7, wherein the e-commerce network usage information includes an amount owed for the purchase of the good or the service.

10. The computer program product as recited in claim 7, wherein the source identification information includes a mailing address for the user.

11. The computer program product as recited in claim 10, wherein the source identification information further includes the user's name.

12. The computer program product as recited in claim 7, wherein the at least part of a user social security number is provided by the user via a mobile telephone.

* * * * *